(12) United States Patent
Wang et al.

(10) Patent No.: US 11,622,078 B2
(45) Date of Patent: Apr. 4, 2023

(54) METHOD AND APPARATUS FOR IMAGE FORMATION USING PREVIEW IMAGES

(71) Applicant: Sony Corporation, Tokyo (JP)

(72) Inventors: Guangyu Wang, Beijing (CN); Xiaobo Wang, Beijing (CN)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 16/756,804

(22) PCT Filed: Mar. 28, 2018

(86) PCT No.: PCT/CN2018/080866
§ 371 (c)(1),
(2) Date: Apr. 16, 2020

(87) PCT Pub. No.: WO2019/183833
PCT Pub. Date: Oct. 3, 2019

(65) Prior Publication Data
US 2021/0105416 A1    Apr. 8, 2021

(51) Int. Cl.
*H04N 5/232*    (2006.01)

(52) U.S. Cl.
CPC ... *H04N 5/232935* (2018.08); *H04N 5/23222* (2013.01)

(58) Field of Classification Search
CPC ......... H04N 5/232935; H04N 5/23222; H04N 5/232933; H04N 5/232939
See application file for complete search history.

(56) References Cited

U.S. PATENT DOCUMENTS

| 2011/0050909 A1* | 3/2011 | Ellenby | G03B 17/24 |
| | | | 348/207.1 |
| 2012/0092515 A1* | 4/2012 | Yim | H04N 5/232935 |
| | | | 348/222.1 |

(Continued)

FOREIGN PATENT DOCUMENTS

| CN | 104284074 A | 1/2015 |
| CN | 105516507 A | 4/2016 |
| CN | 106101536 A | 11/2016 |

(Continued)

OTHER PUBLICATIONS

International Search Report and Written Opinion for corresponding Patent Application No. PCT/CN2018/080866 dated Jan. 4, 2019.

*Primary Examiner* — Nicholas G Giles
(74) *Attorney, Agent, or Firm* — Renner, Otto, Boisselle & Sklar, LLP (57) ABSTRACT

A method and apparatus for image formation, a capturing apparatus and an electronic device. The method includes: determining at least two groups of image capture parameters of a to-be-captured image from a prestored parameter library based on classification information on the to-be-captured image; forming at least two preview images by using the at least two groups of image capture parameters; and displaying the at least two preview images on a screen. Hence, a user may be made to quickly obtain accurate and personalized image capture parameters, and acquisition or determination of the image capture parameters is made more convenient and intelligent, thereby better improving the users experience.

19 Claims, 5 Drawing Sheets

(56) References Cited

U.S. PATENT DOCUMENTS

2014/0152875 A1    6/2014   Tobin
2016/0142626 A1*   5/2016   Bostick ............... G06F 16/5838
                                                                         348/207.11

FOREIGN PATENT DOCUMENTS

CN          107682627 A      2/2018
CN          107820020 A      3/2018
WO     2009/082591 A2      7/2009

\* cited by examiner

METHOD AND APPARATUS FOR IMAGE FORMATION USING PREVIEW IMAGES

TECHNICAL FIELD

This disclosure relates to the field of image processing technologies, and in particular to a method and apparatus for image formation, to a capturing apparatus and to an electronic device.

BACKGROUND

As the number of different types of portable electronic equipment increase (such as a digital single lens reflex (DSLR) camera, a digital mirrorless camera, a smart mobile phone, a tablet PC, and a portable digital camera, etc.), capturing an image or a video has become easier. Electronic equipment generally has a camera, which may capture an object in an automatic manner or manual manner.

For example, to enable an experienced user to capture a personalized image, a DSLR camera or a digital mirrorless camera generally provides a manual setting mode, allowing the user to manually set various pickup parameters (also referred to herein as "image capture parameters"). Pickup parameters may include, for example, a shutter speed, and an aperture (sometimes referred to as "aperture setting," "aperture opening", and so on), etc. In general, pickup parameters dictate the camera settings used to capture the image.

For another example, for the convenience of capturing an image by an unexperienced user, a smart mobile phone or a portable digital camera may provide an automatic mode, in which various pickup parameters (such as a shutter speed, and an aperture, etc.) may be automatically set according to capturing conditions (such as an illumination intensity) detected by a sensor.

However, the pickup parameters in the automatic mode are possibly less accurate than in the manual mode, which may result in an effect of a captured image that is less than optimal. Furthermore, the pickup parameters in the automatic mode may not reflect fondness, preferences, or personality of a user, which may result in the user not being satisfied with the captured image. In the manual mode, pickup parameters are typically set empirically, and a process of manually setting pickup parameters may be time-consuming and troublesome, which is not of interest to most users.

It should be noted that the above description of the background is merely provided for clear and complete explanation of this disclosure and for easy understanding by those skilled in the art. And it should not be understood that the above technical solution is known to those skilled in the art simply because it is described in the background of this disclosure.

SUMMARY

It was found by the inventors that at present, neither the manual mode nor the automatic mode enables a user to quickly obtain accurate and personalized pickup parameters. Therefore, there is a need in the art to make acquisition or determination of pickup parameters more intelligent, so as to improve the user experience.

Embodiments of this disclosure provide a method and apparatus for image formation, a capturing apparatus and an electronic device, in which it is expected that a user can quickly obtain accurate and personalized pickup parameters, and acquisition or determination of pickup parameters is made more intelligent, thereby improving the user experience.

According to a first aspect of the embodiments of this disclosure, there is provided a method for image formation, including:

determining classification information on a to-be-captured image according to a live view image;

determining at least two groups of image capture parameters of the to-be-captured image from a prestored parameter library based on the classification information on the to-be-captured image;

forming at least two preview images by using the at least two groups of image capture parameters to generate the at least two preview images; and displaying the at least two preview images on a screen.

In an embodiment, the at least two preview images include thumbnail images each having a size less than a size of the live view image, and displaying the at least two preview images includes superimposing the at least two preview images on the live view image.

In an embodiment, the method further includes: selecting one of the at least two preview images; and performing image capture based on one or more image capture parameters corresponding to the selected preview image.

In an embodiment, the method further includes: adjusting one or more of the image capture parameters corresponding to the selected preview image.

In an embodiment, the method further includes: storing one or more image capture parameters corresponding to the captured image, so as to at least one of form or update the parameter library; or obtaining one or more image capture parameters corresponding to a captured image from another electronic device, so as to at least one of form or update the parameter library.

In an embodiment, the method further includes: in a case where one of the at least two preview images is selected, displaying one or more image capture parameters corresponding to the selected preview image.

In an embodiment, the preview image is selected by an electronic device by default, or the preview image is selected based on input of a user.

In an embodiment, the method further includes: matching multiple groups of image capture parameters in the parameter library based on the classification information on the to-be-captured image; prioritizing multiple groups of matched image capture parameters; and selecting a predetermined number of groups of image capture parameters from the prioritized multiple groups of image capture parameters, and taking the selected image capture parameters as recommended image capture parameters of the to-be-captured image.

In an embodiment, the parameter library is user specific, and each user has a corresponding parameter library.

In an embodiment, the parameter library is stored in a capturing apparatus or an electronic device, or the parameter library is stored in an external server, and the capturing device is connected to the parameter library via a network.

In an embodiment, the classification information includes at least one of a capturing scenario, a capturing position, a capturing geotag, or a capturing angle.

In an embodiment, the pickup parameters include at least one of a shutter speed, focusing information, a focal length, an aperture value, a light sensitivity, an exposure value, a white balance value, a brightness value, a saturation, or a contrast.

According to a second aspect of the embodiments of this disclosure, there is provided an apparatus for image formation, including:

an information determining unit configured to determine classification information on a to-be-captured image according to a live view image;

a parameter determining unit configured to determine at least two groups of image capture parameters of the to-be-captured image from a prestored parameter library based on the classification information on the to-be-captured image;

a preview image forming unit configured to form at least two preview images by using the at least two groups of image capture parameters to generate the at least two preview images; and an image displaying unit configured to display the at least two preview images on a screen.

According to a third aspect of the embodiments of this disclosure, there is provided a capturing apparatus, including a memory and a processor, the memory storing instructions executed by the processor, and the processing being configured to carry out the method for image formation as described in the first aspect by executing the instructions.

According to a fourth aspect of the embodiments of this disclosure, there is provided an electronic device, including the capturing device as described in the third aspect, and further including a display and at least one camera.

An advantage of the embodiments of this disclosure exists in that at least two groups of image capture parameters of a to-be-captured image are determined from a prestored parameter library based on classification information on the to-be-captured image; at least two preview images are formed by using the at least two groups of image capture parameters, and the at least two preview images are displayed on a screen. Hence, a user may be made to quickly obtain accurate and personalized image capture parameters, and acquisition or determination of the image capture parameters is made more convenient and intelligent, thereby better improving the user experience.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except as specified otherwise. Furthermore, the term "according to" should be understood as "at least partially according to", the term "based on" should be understood as "at least partially based on", except as specified otherwise.

The interchangeable terms "electronic equipment" and "electronic device" may include portable radio communication equipment. The term "portable radio communication equipment", which hereinafter may be referred to as a "mobile radio terminal", "portable electronic device", or "portable communication device", includes all apparatuses such as mobile telephones, pagers, communicators, electronic organizers, personal digital assistants (PDAs), smart phones, media players, tablet PCs, portable communication devices, portable game devices, or the like.

In the present application, embodiments of the disclosure are described primarily in the context of a portable electronic device in the form of a mobile telephone (also referred to as "mobile phone"). However, it shall be appreciated that the disclosure is not limited to the context of a mobile telephone and may relate to any type of appropriate electronic apparatus, examples of such type of electronic apparatus including a digital single lens reflex camera, a digital mirrorless camera, a smart mobile phone, a tablet PC, a portable digital camera, a media player, a portable game device, a PDA, a computer, or the like.

Embodiment of the First Aspect

An embodiment of this disclosure provides a method in a capturing apparatus or an electronic device for image formation. the capturing apparatus or the electronic device may be the above electronic device, which shall be described by taking a smart mobile phone that includes a camera for capturing images (also referred to as recording images) as an example; however, this disclosure is not limited thereto.

Figure 1:
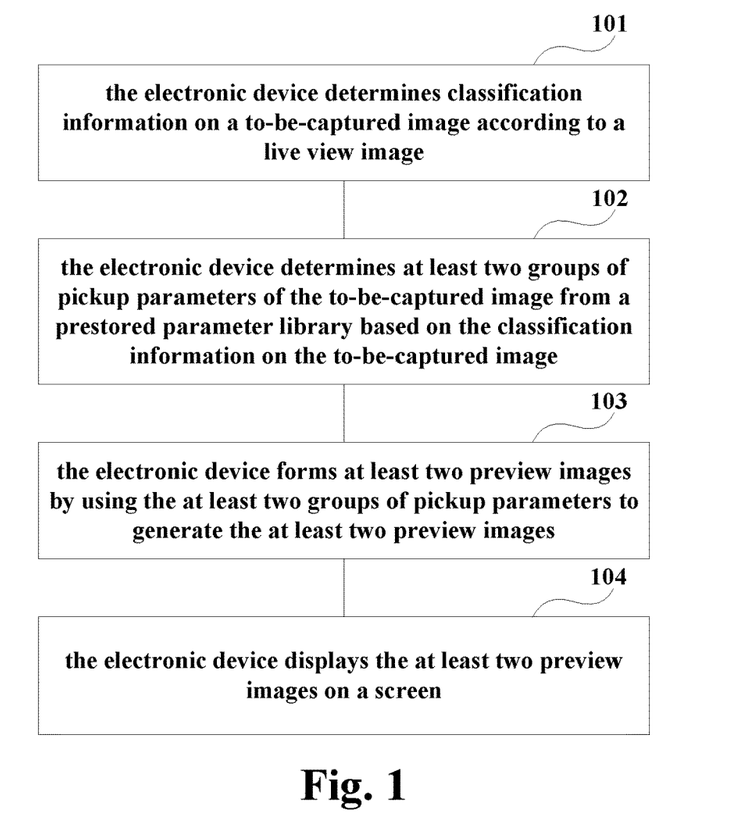
FIG. 1 is a flowchart of the method for image formation of an embodiment of this disclosure.

FIG. 1 is a flowchart of the method for image formation of an embodiment of this disclosure. As shown in FIG. 1, the method includes:

Block 101: the electronic device determines classification information on a to-be-captured image according to a live view image;

Block 102: the electronic device determines at least two groups of pickup parameters (also referred to herein as "image capture parameters") of the to-be-captured image from a prestored parameter library based on the classification information on the to-be-captured image;

Block 103: the electronic device forms at least two preview images by using the at least two groups of pickup parameters to generate the at least two preview images; and Block 104: the electronic device displays the at least two preview images on a screen.

In an embodiment, the classification information may include one or more of the following: a capturing scenario, a capturing time, a capturing position, a capturing geotag (such as a famous building), and a capturing angle. However, this disclosure is not limited thereto, and other classification information may also be included. For example, the capturing scenario may include one or more of the following: a human figure, a scene, a flower, macro-focusing, backlight, a night scene, lamp light, etc. Other capture scenarios may also be included.

Figure 2:
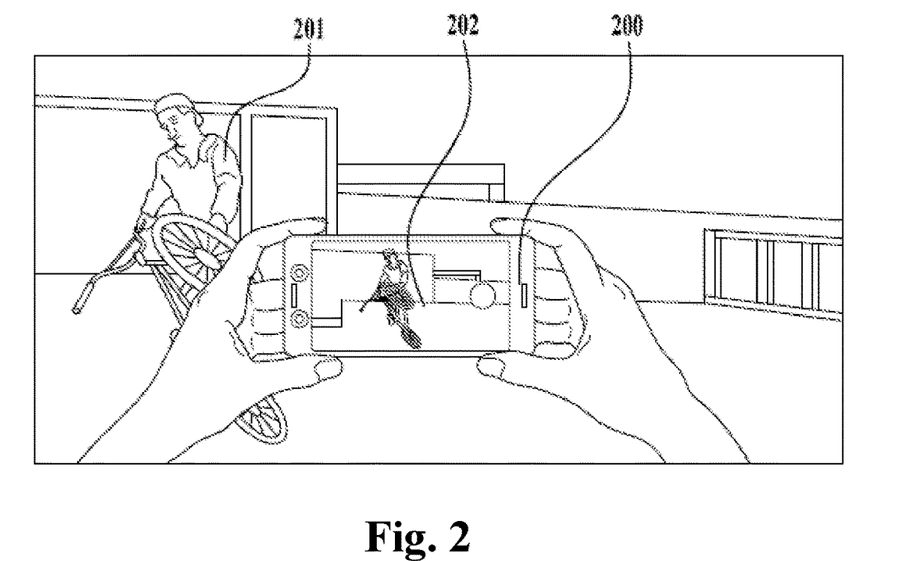
FIG. 2 is a schematic diagram of a capturing scenario of an embodiment of this disclosure.

FIG. 2 is a schematic diagram of a capture scenario of an embodiment of this disclosure. As shown in FIG. 2, when a camera of the electronic device 200 is aimed at an object to be captured 201, a live view may be performed, thereby obtaining a live view image 202 on a screen.

It should be appreciated that the live view image is described in FIG. 2 by taking a single camera as an example, and the preview image is formed on the basis of an image obtained by the camera. However, this disclosure is not limited thereto; for example, for an electronic device having dual cameras, this disclosure may be implemented by using the dual cameras. For example, an image obtained by a main camera is taken as a live view image, and the preview image is formed on a basis of an image obtained by an auxiliary camera.

In an embodiment, the classification information on the current to-be-captured image may be recognized according related existing technologies. For example, whether a current scenario is a human figure scenario may be recognized according to the face recognition technology, or whether a current scenario is a flower scenario may be recognized according to a color of an image, etc. The capture time may be based on a clock of the electronic device, while the capture position and/or geotag may be based on data obtained from a GPS device, accelerometer, etc. The relevant art may be referred to for how to recognize the classification information on the current to-be-captured image.

In an embodiment, the pickup parameters may include one or more of the following: a shutter speed, focus information, a focal length, an aperture value, sensitivity (such as ISO), an exposure value, a white balance value, a brightness value, a saturation degree, and a contrast. However, this disclosure is not limited thereto, and other pickup parameters may be included.

In an embodiment, the parameter library is user specific, and each user has a corresponding parameter library. For example, the parameter library may be stored in a local storage card and/or memory of a capturing device, or the parameter library may be stored in an external server (such as a cloud server), and the capturing device is connected to the parameter library via a network. Hence, personalized pickup parameters may be stored and applied for specific users.

In an embodiment, the parameter library may be formed and updated according to pickup parameters of a captured image. For example, an item in the parameter library may include information as follows: an index or serial number of the captured image, classification information on the captured image, and the pickup parameters of the captured image.

For example, Table 1 shows an example of a parameter library stored in an electronic device.

TABLE 1

| Image index | Scenario | Shutter speed | ISO | Exposure value | Contrast | Brightness | Saturation | ... |
|---|---|---|---|---|---|---|---|---|
| 1 | Human figure | 1/200 | 100 | −0.6 | 52 | 50 | 70 | ... |
| 2 | Backlight | 1/100 | 100 | 0.3 | 50 | 50 | 70 | ... |
| 3 | Scene | 1/50 | 50 | 0.6 | 65 | 80 | 20 | ... |
| 4 | Night scene | 1 | 1600 | 30 | 52 | 30 | 30 | ... |
| 5 | Human figure | 1/4 | 100 | −0.3 | 30 | 50 | 70 | ... |
| ... | ... | ... | ... | ... | ... | ... | ... | ... |

The data shown in Table 1 is merely exemplary, and other classification information may also be included. For example, one or more pickup parameters of the table may be used, or other pickup parameters not mentioned in the table above may be used. Furthermore, the parameter library in the embodiment of this disclosure may be stored together with captured images, or may be stored separately from captured images, and this disclosure is not limited thereto.

In an embodiment, the parameter library may be formed according to pickup parameters of images captured by a user at a manual mode; however, this disclosure is not limited thereto. For example, the pickup parameters of the captured images may also be acquired from another electronic device, and the parameter library is formed according to the acquired pickup parameters. Hence, a personalized parameter library may be formed for fondness of each user.

In an embodiment, the pickup parameters of the to-be-captured image may be determined from the prestored parameter library based on the classification information on the to-be-captured image (e.g., using the parameter library stored in the electronic device as shown in Table 1). In using the electronic device to capture an image, the camera may be powered on, and the classification information on the current to-be-captured image may be obtained from the live view image; for example, the classification information is "a human figure". The electronic device, based on the classification information being "a human figure", may determine from the parameter library that the pickup parameters of the to-be-captured image are pickup parameters shown in an item in Table 1, such as pickup parameters shown in the first row or in the first column.

The above description is given by taking one item as an example, that is, multiple pickup parameters in one item may be determined according to the classification information. However, this disclosure is not limited thereto; for example, pickup parameters (i.e. multiple groups of pickup parameters) in multiple items may be determined according to the classification information.

It should be appreciated that determining a recommended group of pickup parameters from the parameter library according to the classification information is only schematically described or illustrated above. However, this disclosure is not limited thereto, and a particular recommendation policy or manner may be determined according to an actual situation.

In an embodiment, at least two preview images may be formed by using at least two groups of pickup parameters, and the at least two preview images may be displayed on a screen. For example, the at least two preview images may be superimposed on the live view image, and the preview images and the live view image are displayed on the screen together. Hence, the pickup parameters may be intuitively and conveniently recommended to the user.

Figure 3:
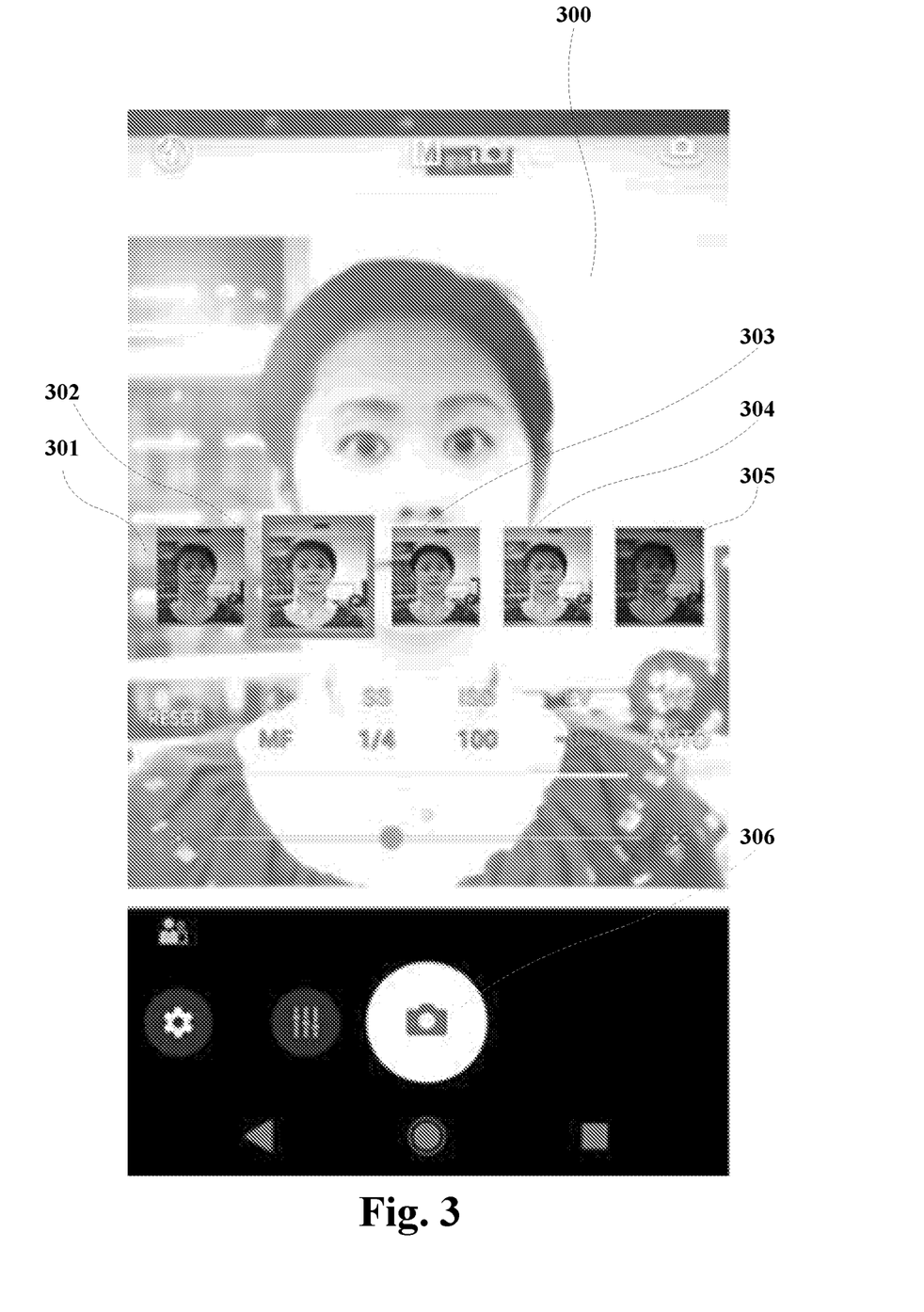
FIG. 3 is a schematic diagram of an example of displaying preview images in the electronic device of an embodiment of this disclosure.

FIG. 3 is a schematic diagram of an example of displaying preview images in the electronic device of the embodiment of this disclosure. As shown in FIG. 3, the at least two preview images may be formed by using the at least two groups of pickup parameters determined from the parameter library. These preview images are thumbnail images of sizes less than that of the live view image, and these preview images are superimposed on the live view image. The relevant art may be referred to for how to form the thumbnail images.

For example, five preview images 301-305 are formed in FIG. 3, which are thumbnail images of the live view image 300. However, as corresponding pickup parameters are different, display effects of the preview images 301-305 are different.

It should be appreciated that the preview images are only illustrated in FIG. 3. However, this disclosure is not limited thereto; for example, the preview images are not limited to blocks, and may also be in other forms. And furthermore, the preview images are not limited to being arranged linearly; for example, they may be arranged in a star shape, or a size of a most recommended the preview image may be set to be larger than those of other preview images, etc. Sizes, display manners, and arrangement manners, of the preview images, are not limited in this disclosure.

In an embodiment, when one of the at least two preview images is determined (or selected), one or more pickup parameters to which the determined preview image corresponds may be displayed. The one preview image may be determined by the electronic device by default; for example, the electronic device may determine by default that a first preview image is selected and pickup parameters to which it corresponds are displayed on a screen. Or, the one preview image may be determined based on input of a user; for example, the user clicks a preview image, and the preview image is selected and pickup parameters to which it corresponds are displayed on a screen.

For example, as shown in FIG. 3, five preview images 301-305 are formed, and are superimposed and displayed on the live view image 300. Furthermore, a second preview image 302 is selected by the user, and a group of pickup parameters to which it corresponds include that a shutter speed (SS) value is ¼, a light sensitivity (ISO) value is 100, an exposure value (EV) is −0.3, and a white balance (WB) value is AUTO . . . . As shown in FIG. 3, this group of pickup parameters is displayed on the screen as recommend pickup parameters for the user.

In an embodiment, the user may further adjust the pickup parameter to which the determined preview image corresponds. For example, after a pickup parameter is clicked, an edit screen of the pickup parameter will appear, the pickup parameter may be adjusted, and the preview image may be varied in real-time manner according to the adjusted pickup parameter. Hence, a personalized pickup parameter may be obtained more conveniently.

Furthermore, the user may click a "capture" button 306 to capture an image and, hence, the recommended pickup parameters are used. In practical use, the "capture" button may be a virtual key generated by software, or may be an entity key formed by hardware.

It should be appreciated that displaying the recommended pickup parameters on the screen by a smart mobile phone is only illustrated in FIG. 3. However, this disclosure is not limited thereto. Particular pickup parameters may be selected as demanded, and a particular display manner or style may be appropriately adjusted according to devices. Furthermore, the above particular numeric values are illustrative only, and do not mean that they shall be used in practical cases, and these numeric values may be adjusted in use.

Hence, the pickup parameters may be recommended to the user according to the prestored parameter library, so as to obtain parameters reflecting fondness, preferences, or personality of a user, and improve a level of satisfaction of the user. In comparison with an automatic mode, the pickup parameters recommended according to this disclosure may embody fondness and personality of the user.

In this disclosure, capture of an image may be performed in the manual mode. However, this disclosure is not limited thereto, and modes other than the manual mode may also be used, such as a recommended mode, or a semi-automatic mode, etc. Updating the parameter library and determining the pickup parameters shall be further explained below by taking a combination of the manual mode and the recommended mode as an example.

Figure 4:
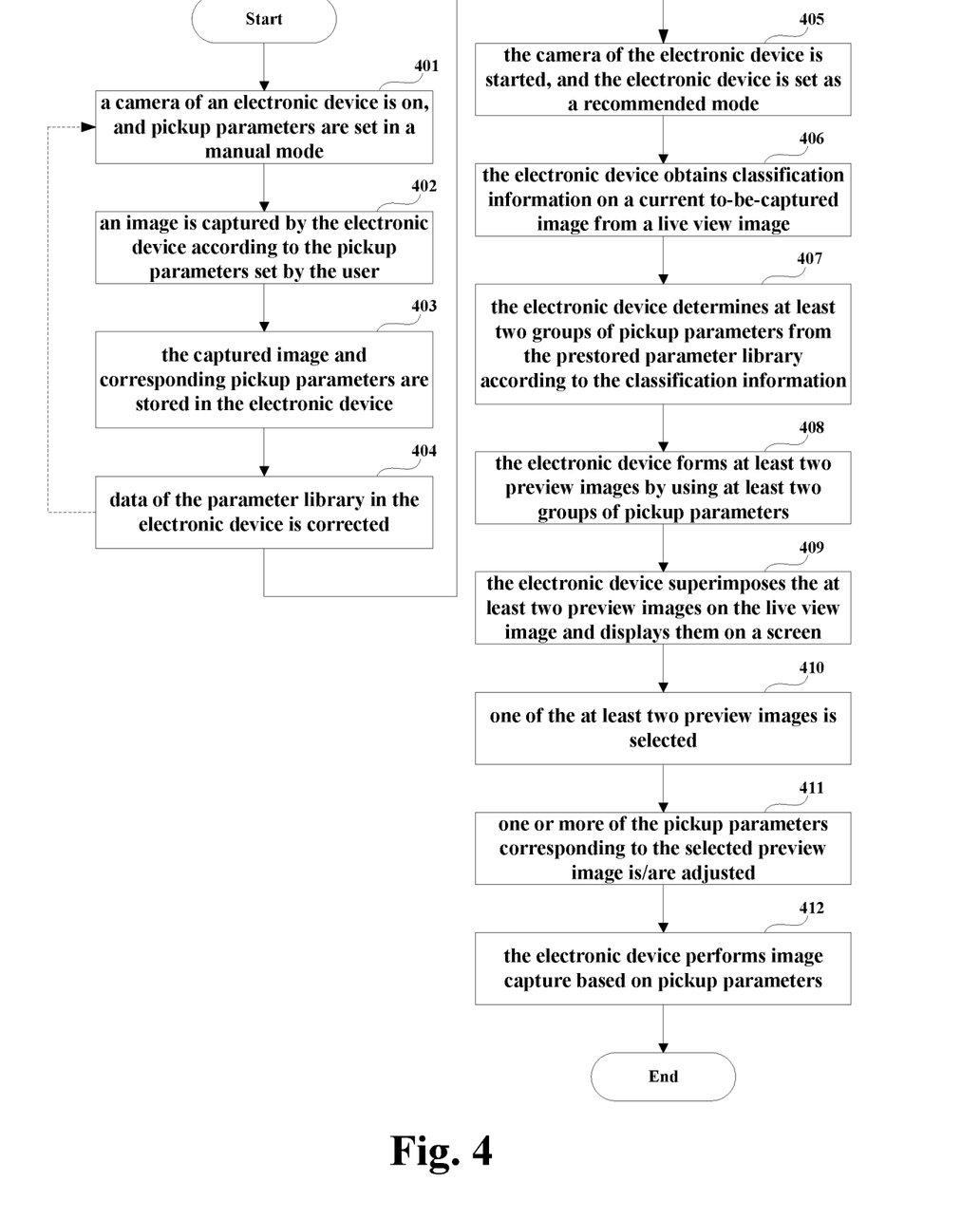
FIG. 4 is another flowchart of the method for image formation of the embodiment of this disclosure.

FIG. 4 is another flowchart of the method for image formation of the embodiment of this disclosure. As shown in FIG. 4, the method includes:

Block 401: the camera of the electronic device is on (or started, initiated, and so on) by the user, and pickup parameters are set (or configured) by the user in the manual mode.

Block 402: an image is captured by the electronic device according to the pickup parameters set by the user.

Block 403: the captured image is stored in the electronic device, and corresponding pickup parameters are also stored in the electronic device, so as to form and/or update the parameter library.

For example, the parameter library shown in Table 1 may be formed; however, this disclosure is not limited thereto.

Block 404: data of the parameter library in the electronic device is corrected by the user.

For example, when deleting an image, the corresponding pickup parameters also may be deleted, so as to update the parameter library. For example, after an image is captured, if the user is not satisfied with the image in replaying and viewing the image, the image may be deleted, and at the same time a record of pickup parameters to which the image corresponds may be deleted from the parameter library.

In this embodiment, blocks 401-404 may be executed once or for multiple times, and the parameter library may be formed and updated, so as to provide recommended pickup parameters for subsequent capture.

Block 405: the camera of the electronic device is started by the user, and the electronic device is set by the user as a recommended mode.

Block 406: the electronic device obtains classification information on a current to-be-captured image from a live view image.

Block 407: the electronic device determines at least two groups of pickup parameters of the to-be-captured image from the prestored parameter library according to the classification information on the to-be-captured image.

In one implementation, multiple groups of pickup parameters in the parameter library may be matched by the electronic device based on the classification information on the to-be-captured image. The multiple groups of matched pickup parameters may be prioritized, and a predetermined number (such as N) of groups of pickup parameters may be selected by the electronic device from the prioritized multiple groups of pickup parameters. The selected groups are taken as recommended pickup parameters of the to-be-captured image.

For example, if the classification information on the current to-be-captured image is "human figure" and 12 groups of pickup parameters correspond to "human figure", they may be matched from the parameter library. The 12 groups of pickup parameters may be prioritized using a prioritization rule. For example, a prioritization rule may be a chronological order of the pickup parameters (e.g., most recently updated), that is, a pickup parameter group having a most-recently updated capture time has a higher priority than those that have not been recently updated. However, this disclosure is not limited thereto. Thereafter, assuming N=5, then five groups of pickup parameters are selected as the recommended pickup parameters (the particular numeric value of N being predetermined).

Block 408: the electronic device forms at least two preview images by using at least two groups of pickup parameters.

Block 409: the electronic device superimposes the at least two preview images on the live view image and displays them on a screen.

As shown in FIG. 4, the method may further include:

Block 410: one of the at least two preview images is selected.

For example, the user may click one of the preview images, and pickup parameters corresponding to the selected preview image may be displayed on the screen.

In an embodiment, the recommended pickup parameters may not be adjusted, and an image is captured by directly using the recommended pickup parameters. Alternatively, slight adjustment may be performed on the recommended pickup parameters according to an actual situation, and then an image is captured by using the slightly adjusted pickup parameters.

Block 411: one or more of the pickup parameters corresponding to the selected preview image is/are adjusted by the user.

For example, the electronic device may display an edit view in response of input of the user, then electronic device may change a value of a pickup parameter in response of the user. Therefore, one or more of the pickup parameters may be adjusted, preferred and more personalized pickup parameters can be obtained.

Block 412: the electronic device performs image capture based on pickup parameters corresponding to the selected preview image.

In an embodiment, after the image capture, the pickup parameters that were actually used to capture the image may be stored, and the parameter library may be updated.

It should be appreciated that FIG. 4 illustrates an embodiment of this disclosure only. However, this disclosure is not limited thereto. For example, an order of execution of the blocks or steps may be appropriately adjusted, and furthermore, some other blocks or steps may be added, or some of these blocks or steps may be reduced. Appropriate modification may be made by those skilled in the art, and it is not only limited to what is contained in FIG. 4.

It can be seen from the above embodiment that at least two groups of pickup parameters of a to-be-captured image are determined from a prestored parameter library based on classification information on the to-be-captured image; at least two preview images are formed by using the at least two groups of pickup parameters, and the at least two preview images are displayed on a screen. Hence, a user may quickly obtain accurate and personalized pickup parameters, and acquisition or determination of the pickup parameters is made more convenient and intelligent, thereby better improving the user experience.

Embodiment of the Second Aspect

An embodiment of this disclosure provides an apparatus for image formation, which may be, for example, an electronic device having an image capture function, and may also be one or more components of assemblies configured in the electronic device. Contents in this embodiment corresponding to those in the above embodiment shall not be described herein any further.

Figure 5:
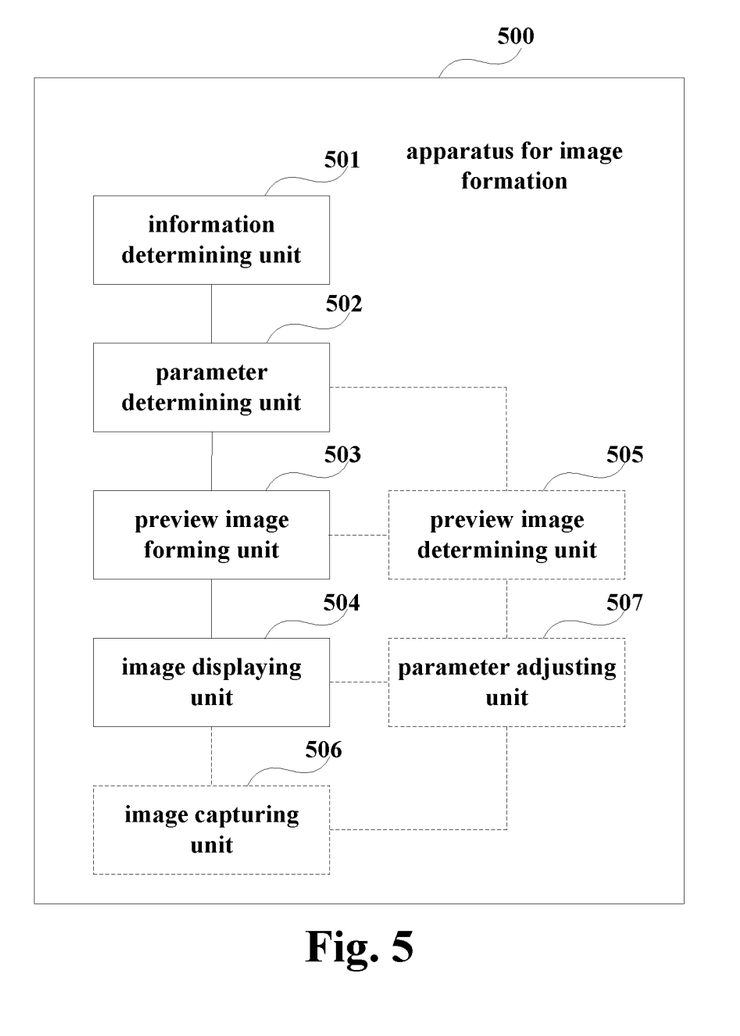
FIG. 5 is a schematic diagram of the apparatus for image formation of an embodiment of this disclosure.

FIG. 5 is a schematic diagram of the apparatus for image formation of the embodiment of this disclosure. As shown in FIG. 5, an apparatus 500 for image formation includes:

an information determining unit 501 configured to determine classification information on a to-be-captured image according to a live view image;

a parameter determining unit 502 configured to determine at least two groups of image capture parameters of the to-be-captured image from a prestored parameter library based on the classification information on the to-be-captured image;

a preview image forming unit 503 configured to form at least two preview images by using the at least two groups of image capture parameters to generate the at least two preview images; and an image displaying unit 504 configured to display the at least two preview images on a screen.

In an embodiment, the at least two preview images include thumbnail images each having a size less than a size of the live view image, and the at least two preview images are superimposed on the live view image.

In an embodiment, as shown in FIG. 5, the apparatus 500 may further include:

a preview image determining unit 505 configured to determine (or select) one of the at least two preview images; and an image capturing unit 506 configured to perform image capture based on image capture parameters corresponding to the determined (or selected) preview image.

In an embodiment, as shown in FIG. 5, the apparatus 500 may further include:

a parameter adjusting unit 507 configured to adjust one or more of the image capture parameters corresponding to the determined (or selected) preview image.

In an embodiment, one or more image capture parameters corresponding to the determined (or selected) preview image may be stored, so as to form and/or update the parameter library. Alternatively, one or more image capture parameters corresponding to the determined (selected) preview image may be obtained from another electronic device, so as to form and/or update the parameter library.

In an embodiment, when one of the at least two preview images is selected, one or more image capture parameters corresponding to the selected preview image may be displayed. The preview image may be selected by default, or, the preview image may be selected based on input of a user.

In an embodiment, the parameter determining unit 502 may be configured to match multiple groups of image capture parameters in the parameter library based on the classification information on the to-be-captured image. The parameter determining unit 502 may be configured to prioritize multiple groups of matched image capture parameters. The parameter determining unit 502 may further be configured to select a predetermined number of groups of image capture parameters from the prioritized multiple groups of image capture parameters, and to take the selected image capture parameters as recommended image capture parameters of the to-be-captured image.

In an embodiment, the parameter library is user specific, and each user has a corresponding parameter library.

In an embodiment, the parameter library is stored in a capturing device or an electronic device. Alternatively, the parameter library is stored in an external server, and the capturing device is connected to the parameter library via a network.

In an embodiment, the classification information includes at least one of a capturing scenario, a capturing position, a capturing geotag, or a capturing angle.

In an embodiment, the pickup parameters include at least one of a shutter speed, a focusing information, a focal length, an aperture value, a light sensitivity, an exposure value, a white balance value, a brightness value, a saturation, or a contrast.

It should be appreciated that the components or modules related to this disclosure are exemplary. However, this disclosure is not limited thereto, and the apparatus 500 for image formation may further include other components or modules, and the relevant art may be referred to for particulars of these components or modules.

In an embodiment, these units (such as information determining unit 501) may be, for example, carried out by software, that is, they may be software modules formed by software codes. These units may be stored in a non-transitory computer readable medium (memory) of the electronic device, and their functions may be carried out by the memory and a processor. However, this disclosure is not limited thereto; for example, these units may also be chips into which codes are written. And these particular implementations are not limited in this disclosure.

It can be seen from the above embodiment that at least two groups of pickup parameters of a to-be-captured image are determined from a prestored parameter library based on classification information on the to-be-captured image; at least two preview images are formed by using the at least two groups of pickup parameters, and the at least two preview images are displayed on a screen. Hence, a user may quickly obtain accurate and personalized pickup parameters, and acquisition or determination of the pickup parameters is made more convenient and intelligent, thereby better improving the user experience.

Embodiment of the Third Aspect

An embodiment of this disclosure provides a capturing apparatus and an electronic device, the capturing apparatus or the electronic device controlling an element of image formation (such as a camera, and a lens, etc.). The electronic device may be a mobile phone, digital single lens reflex camera, a digital mirrorless camera, a tablet PC, a portable digital camera, a media player, a portable game device, a PDA, a computer, or the like, and this embodiment is not limited thereto.

In an embodiment, the capturing apparatus or the electronic device may include an element of image formation, a focusing device and the apparatus for image formation as described in the second aspect. The contents in the first and second aspects are incorporated herein, with repeated parts being not described further.

In an embodiment, the capturing apparatus or the electronic device may be a mobile terminal, e.g., a mobile phone, smart phone, and so on; however, this disclosure is not limited thereto, for example, it may also be a digital camera, etc.

Figure 6:
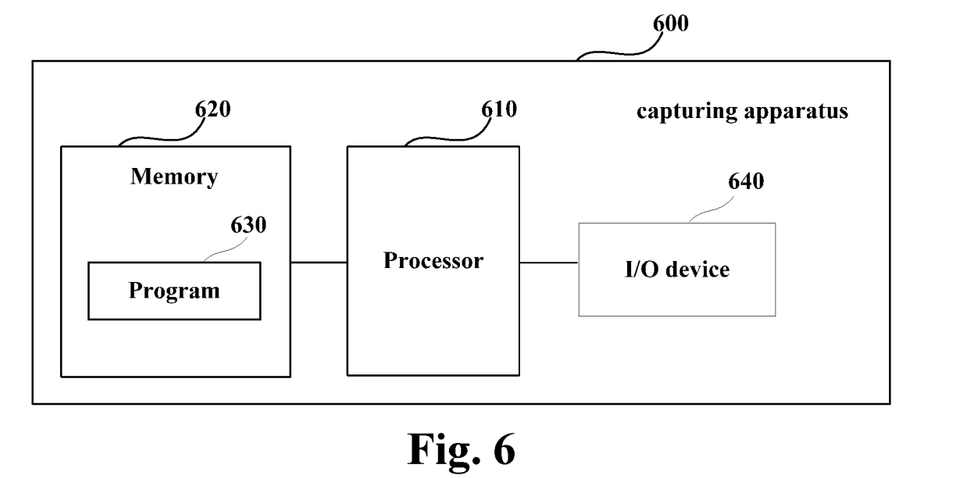
FIG. 6 is a schematic diagram of the capturing apparatus of an embodiment of this disclosure.

FIG. 6 is a schematic diagram of the capturing apparatus of the embodiment of this disclosure. As shown in FIG. 6, the capturing apparatus 600 may include a processor 610 (such as a central processing unit (CPU)) and a memory 620, the memory 620 being coupled to the processor 610. The memory 620 may store various data, and furthermore, it may store a program 630 for information processing, and execute the program under control of the processor 610.

For example, the processor 610 may be configured to execute the program 630 to carry out the method for image formation described in the embodiment of the first aspect. For example, the processor 610 may be configured to perform the following control: determining classification information on a to-be-captured image according to a live view image; determining at least two groups of image capture parameters of the to-be-captured image from a prestored parameter library based on the classification information on the to-be-captured image; forming at least two preview images by using the at least two groups of image capture parameters to generate the at least two preview images; and displaying the at least two preview images on a screen.

Furthermore, as shown in FIG. 6, the capturing apparatus 600 may include an input/output (I/O) device 640, etc. Functions of the above components may be similar to those in the relevant art, which shall not be described herein any further. It should be appreciated that the capturing apparatus 600 does not necessarily include all the components shown in FIG. 6. Furthermore, the capturing apparatus 600 may include components not shown in FIG. 6, and the relevant art may be referred to for conventional components that may be included with the capturing apparatus 600.

Figure 7:
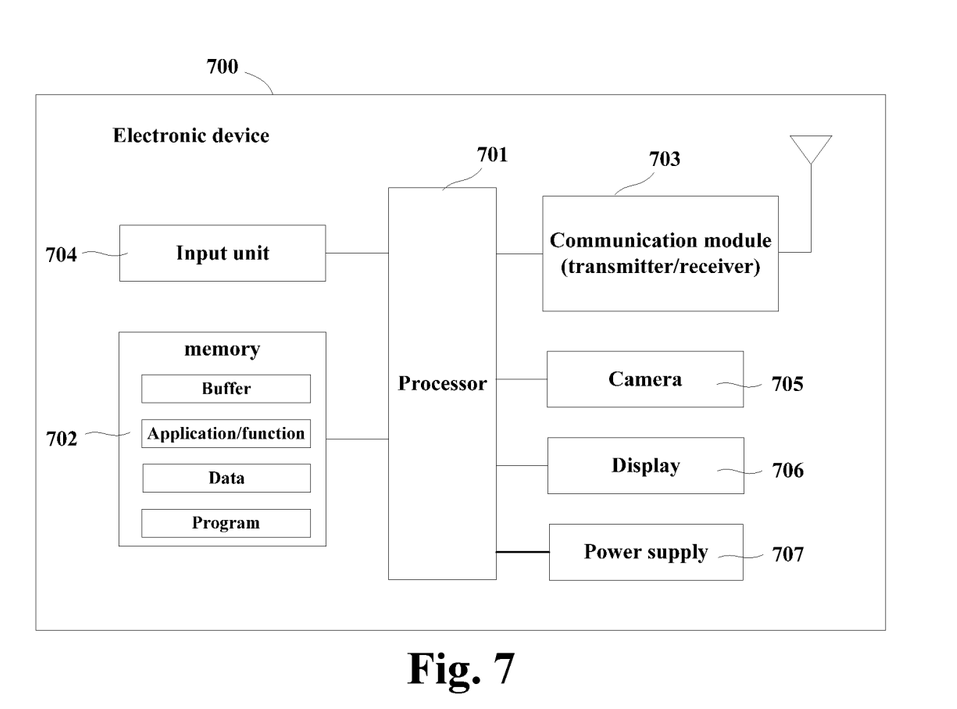
FIG. 7 is a block diagram of a systematic structure of the electronic device of an embodiment of this disclosure.

FIG. 7 is a block diagram of a structure of the electronic device of the embodiment of this disclosure. As shown in FIG. 7, the electronic device 700 may include a processor 701 and a memory 702, the memory 702 being coupled to the processor 701 and storing instructions executed by the processor 701. It should be appreciated that this figure is illustrative only, and other types of structures may also be used, so as to supplement or replace this structure and achieve a telecommunications function or other functions.

In an implementation, the functions of the apparatus 500 for image formation may be integrated into the processor 701. For example, the processor 701 may be configured to execute a program to carry out the method for image formation described in the embodiment of the first aspect. For example, the processor 701 may be configured to perform the following control by executing the instructions: determining classification information on a to-be-captured image according to a live view image; determining at least two groups of image capture parameters of the to-be-captured image from a prestored parameter library based on the classification information on the to-be-captured image; forming at least two preview images by using the at least two groups of image capture parameters to generate the at least two preview images; and displaying the at least two preview images on a screen.

In another implementation, the apparatus 500 for image formation and the processor 701 may be configured separately. For example, the apparatus 500 for image formation may be configured as a chip connected to the processor 701, such as one or more chips of an integrated circuit, with its functions being realized under control of the processor 701.

In an embodiment, the at least two preview images include thumbnail images each having a size less than a size of the live view image, and the processor 610 or 701 may be configured to perform the following control: superimposing the at least two preview images on the live view image.

In an embodiment, the processor 610 or 701 may be configured to perform the following control: selecting one of the at least two preview images; and performing image capture based on image capture parameters corresponding to the selected preview image.

In an embodiment, the processor 610 or 701 may be configured to perform the following control: adjusting one or more of the image capture parameters corresponding to the selected preview image.

In an embodiment, the processor 610 or 701 may be configured to perform the following control: storing image capture parameters corresponding to the captured image, so as to at least one of form or update the parameter library; or obtaining one or more image capture parameters corresponding to a captured image from another electronic device, so as to at least one of form or update the parameter library.

In an embodiment, the processor 610 or 701 may be configured to perform the following control: in a case where one of the at least two preview images is selected, displaying one or more image capture parameters corresponding to the selected preview image.

In an embodiment, the preview image is selected by an electronic device by default, or the preview image is selected based on input of a user.

In an embodiment, the processor 610 or 701 may be configured to perform the following control: matching multiple groups of image capture parameters in the parameter library based on the classification information on the to-be-captured image; prioritizing multiple groups of matched image capture parameters; and selecting a predetermined number of groups of image capture parameters from the prioritized multiple groups of image capture parameters, and taking the selected image capture parameters as recommended image capture parameters of the to-be-captured image.

In an embodiment, the parameter library is user specific, and each user has a corresponding parameter library.

In an embodiment, the parameter library is stored in a capturing device or an electronic device; or the parameter library is stored in an external server, and the capturing device is connected to the parameter library via a network.

In an embodiment, the classification information includes at least one of a capturing scenario, a capturing position, a capturing geotag, or a capturing angle.

In an embodiment, the pickup parameters include at least one of a shutter speed, focusing information, a focal length, an aperture value, a light sensitivity, an exposure value, a white balance value, a brightness value, a saturation, or a contrast.

As shown in FIG. 7, the electronic device 700 may further include a communication module 703, an input unit 704, a camera 705, a display 706, and a power supply 707.

The processor 701 (sometimes referred to as a controller or control, which may include a microprocessor or other processor devices and/or logic devices) receives input and controls operations of every component of the electronic device 700. The input unit 704 provides input to the processor 701. The input unit 704 is, for example, a button or a touch input device. The camera 705 is configured to capture image data, and to provide the captured image data to the processor 701 for use in a conventional manner, such as storage, and transmission, etc.

The power supply 707 is configured to supply power to the electronic device 700. The display 706 is configured to display objects to be displayed, such as images, and words, etc. The display may be, for example, an LCD display or an LED display; however, it is not limited thereto and may be another display of a type that currently exists or comes into existence in the future.

The memory 702 may be a solid state memory, and may be a read-only memory (ROM), a random-access memory (RAM), and/or a SIM card, etc. The memory may also be a memory that retains information when power is turned off (e.g., a non-volatile memory), may be selectively erased, and may be provided with more data. An example of such a memory is sometimes referred to as an EPROM, etc. The memory 702 may also be another type of device. The memory 702 may include a buffer memory (sometimes referred to as a buffer). The memory 702 may include an application/function storage portion configured to store applications and function programs or procedures for executing operations of the electronic equipment 700 via the processor 701.

The memory 702 may further include a data storage portion configured to store data, such as a contact, digital data, a picture, a voice and/or any other data used by the electronic device 700. A driver storage portion of the memory 702 may include various drivers of the electronic device 700 for implementing communication functions and/or for executing other functions (such as message transmission application, and directory application, etc.) of the electronic device 700.

The communication module 703 may include a transmitter/receiver transmitting and receiving signals via antennas. The communication module (transmitter/receiver) 703 is coupled to the processor 701 to provide input signals and receive output signals, which may be similar to a conventional communication terminal. Based on different communication technologies, in the same electronic device, multiple communication modules 703, such as a cellular network module, a Bluetooth module and/or a WLAN module, etc., may be provided, so as to achieve general telecommunications functions.

It should be appreciated that FIG. 7 only illustrates a part of the structure of the electronic device 700. The electronic device 700 does not necessarily include all the components shown In FIG. 7. Furthermore, the electronic device 700 may include components not shown in FIG. 7, and the relevant art may be referred to for conventional components that may be included with the electronic device 700.

An embodiment of the present disclosure provides a computer readable program code, which, when executed in electronic device, will cause the electronic device to carry out the method for image formation as described in the embodiment of the first aspect.

An embodiment of the present disclosure provides a non-transitory computer readable medium, including a computer readable program code, which will cause an electronic device to carry out the method for image formation as described in the embodiment of the first aspect.

The preferred embodiments of the present disclosure are described above with reference to the drawings. The many features and advantages of the embodiments are apparent from the detailed specification and, thus, it is intended by the appended claims to cover all such features and advantages of the embodiments that fall within the scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present disclosure may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present disclosure include other implementations, wherein the functions may be executed in manners different from those shown or discussed, including executing the functions according to the related functions in a substantially simultaneous manner or in a reverse order, which should be understood by those skilled in the art to which the present disclosure pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present disclosure. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present disclosure by using the devices.

Particular embodiments of the present disclosure have been disclosed herein. Those skilled in the art will readily recognize that the present disclosure is applicable in other environments. In practice, there exist many embodiments and implementations. The appended claims are by no means intended to limit the scope of the present disclosure to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present disclosure has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present disclosure with respect to structure. Furthermore, although the particular feature of the present disclosure is described with respect to only one or more of the illustrated embodiments, such a feature may be combined with one or more other features of other embodiments as desired and in consideration of advantageous aspects of any given or particular application.

What is claimed is:

1. A method for image formation, comprising:
    determining classification information on a to-be-captured image according to a live view image;
    determining at least two groups of image capture parameters of the to-be-captured image from a prestored parameter library based on the classification information on the to-be-captured image, wherein the determining includes
        matching multiple groups of image capture parameters in the parameter library based on the classification information on the to-be-captured image;
        prioritizing the multiple groups of matched image capture parameters;

selecting a predetermined number of selected groups of image capture parameters from the prioritized multiple groups of image capture parameters, and taking the selected groups of image capture parameters as recommended image capture parameters of the to-be-captured image;

forming at least two preview images by using the at least two groups of image capture parameters to generate the at least two preview images;

displaying the at least two preview images on a screen;

selecting one of the at least two preview images;

adjusting one or more of the image capture parameters corresponding to the selected preview image; and performing image capture based on one or more image capture parameters corresponding to the selected preview image.

2. A method for image formation, comprising:

determining classification information on a to-be-captured image according to a live view image;

determining at least two image capture parameters of the to-be-captured image from a parameter library on a server based on the classification information on the to-be-captured image; and providing the at least two image capture parameters of the to-be-captured image;

wherein the determining the at least two image capture parameters includes:

retrieving multiple image capture parameters in the parameter library based on the classification information on the to-be-captured image;

prioritizing each of the multiple image capture parameters; and selecting the at least two image capture parameters from the prioritized multiple image capture parameters as recommended image capture parameters of the to-be-captured image.

3. The method according to claim 2, wherein the method further comprises:

storing one or more image capture parameters corresponding to a captured image, so as to at least one of form or update the parameter library; or obtaining one or more image capture parameters corresponding to a captured image from an electronic device, so as to at least one of form or update the parameter library.

4. The method according to claim 2, wherein the parameter library is user specific, and each user has a corresponding parameter library.

5. The method according to claim 2, wherein the classification information comprises at least one of a capturing scenario, a capturing position, a capturing geotag, or a capturing angle.

6. The method according to claim 2, wherein the at least two image capture parameters comprise at least one of a shutter speed, focusing information, a focal length, an aperture value, a light sensitivity, an exposure value, a white balance value, a brightness value, a saturation, or a contrast.

7. The method according to claim 2, wherein the selecting is conducted based on prioritized information concerning the multiple image capture parameters.

8. A capturing apparatus, comprising a memory and a processor, the memory storing instructions executed by the processor, and the processor being configured to carry out the method for image formation as claimed in claim 2 by executing the instructions.

9. An electronic device, comprising a memory, a processor, a display and at least one camera, the memory storing instructions executed by the processor, and the processor being configured to carry out the method for image formation as claimed in claim 2 by executing the instructions.

10. A method for image formation, comprising:

forming at least two preview images by using at least two image capture parameters for a to-be-captured image, the at least two image capture parameters determined from a parameter library on a server based on classification information on the to-be-captured image, the classification information determined according to a live view image, wherein the at least two image capture parameters are determined from the parameter library by:

retrieving multiple image capture parameters in the parameter library based on the classification information on the to-be-captured image;

prioritizing each of the retrieved multiple image capture parameters; and selecting the at least two image capture parameters from the prioritized multiple image capture parameters as recommended image capture parameters of the to-be-captured image;

displaying the at least two preview images on a screen;

selecting one of the at least two preview images;

adjusting one or more of the image capture parameters corresponding to the selected preview image; and performing image capture based on one or more image capture parameters corresponding to the selected preview image.

11. The method according to claim 10, wherein the at least two preview images comprise thumbnail images each having a size less than a size of the live view image, and the displaying the at least two preview images includes superimposing the at least two preview images on the live view image.

12. The method according to claim 10, wherein the method further comprises:

in a case where one of the at least two preview images is selected, displaying one or more image capture parameters corresponding to the selected preview image.

13. The method according to claim 10, wherein one preview image is selected by an electronic device by default, or the one preview image is selected based on input of a user.

14. The method according to claim 10, wherein the parameter library is user specific, and each user has a corresponding parameter library.

15. The method according to claim 10, wherein the classification information comprises at least one of a capturing scenario, a capturing position, a capturing geotag, or a capturing angle.

16. The method according to claim 10, wherein the at least two image capture parameters comprise at least one of a shutter speed, focusing information, a focal length, an aperture value, a light sensitivity, an exposure value, a white balance value, a brightness value, a saturation, or a contrast.

17. A capturing apparatus, comprising a memory and a processor, the memory storing instructions executed by the processor, and the processor being configured to carry out the method for image formation as claimed in claim 10 by executing the instructions.

18. An electronic device, comprising a memory, a processor, a display and at least one camera, the memory storing instructions executed by the processor, and the processor being configured to carry out the method for image formation as claimed in claim 10 by executing the instructions.

19. An apparatus for image formation, comprising:
- a preview image forming unit configured to form at least two preview images by using at least two image capture parameters for a to-be-captured image, the at least two image capture parameters determined from a parameter library on a server based on classification information on the to-be-captured image, the classification information determined according to a live view image, wherein the at least two image capture parameters are determined from the parameter library by:
  - retrieving multiple image capture parameters in the parameter library based on the classification information on the to-be-captured image;
  - prioritizing each of the retrieved multiple image capture parameters; and
  - selecting the at least two image capture parameters from the prioritized multiple image capture parameters as recommended image capture parameters of the to-be-captured image;
- an image displaying unit configured to display the at least two preview images on a screen; and
- a parameter adjusting unit configured to adjust one or more of the image capture parameters corresponding to a selected preview image of the at least two preview images.

* * * * *